United States Patent [19]

Jordan et al.

[11] Patent Number: 4,532,403

[45] Date of Patent: Jul. 30, 1985

[54] WELD SPATTER PROTECTIVE COATING

[75] Inventors: Lester W. Jordan, Cranston, R.I.; Joseph F. Loersch, Bolton; Robert G. Adinolfi, Manchester, both of Conn.

[73] Assignee: United Technologies Corporation, Hartford, Conn.

[21] Appl. No.: 600,639

[22] Filed: Apr. 16, 1984

[51] Int. Cl.$^3$ .............................................. B23K 15/00
[52] U.S. Cl. ........................ 219/121 ED; 219/121 EC
[58] Field of Search ................ 219/121 EC, 121 ED, 219/121 EB, 121 EM, 121 LC, 121 LD, 121 L, 121 LM

[56] References Cited

U.S. PATENT DOCUMENTS

| | | | |
|---|---|---|---|
| 3,088,847 | 5/1963 | Pines | 117/75 |
| 3,445,265 | 5/1969 | Bentley et al. | 117/49 |
| 3,461,027 | 8/1969 | Plueddemann | 161/193 |
| 3,772,066 | 11/1973 | Clark et al. | 117/132 |
| 3,790,530 | 2/1974 | Koener et al. | 260/77.5 |
| 4,022,925 | 5/1977 | Reuter et al. | 427/35 |
| 4,052,524 | 10/1977 | Harakas et al. | 428/383 |
| 4,150,181 | 4/1979 | Smith | 427/444 |
| 4,156,807 | 5/1979 | Howard et al. | 219/121 EM |
| 4,218,498 | 8/1980 | Cohen | 427/336 |
| 4,239,954 | 12/1980 | Howard et al. | 219/121 EH |

*Primary Examiner*—C. L. Albritton
*Attorney, Agent, or Firm*—Harry J. Gwinnell

[57] ABSTRACT

By coating a workpiece with a uniform layer of polyimide containing surfactant upon the nonweld areas, spatter produced in electron beam welding of the workpiece is prevented from adhering to the workpiece surface in the nonweld areas. The polyimide coating is so constituted as to be adherent, heat stable, acid resistant, and chemically removeable. Silicone surfactant is preferred.

2 Claims, No Drawings

WELD SPATTER PROTECTIVE COATING

DESCRIPTION

1. Technical Field

The field of art to which this invention pertains is welding, and specifically welding methods utilizing electron beam energy.

2. Background Art

The use of electron beam energy to machine and otherwise work both metallic and nonmetallic workpieces is a relatively recent development. Note, for example, U.S. Pat. Nos. 4,156,807 and 4,239,954. However, there has been some difficulty when utilizing electron beam energy for welding in preventing weld spatter from adhering to nonweld areas of the workpiece. This can present a problem both from an aesthetic point of view and from a structural (e.g. aerodynamic) point of view based on the utility of the finished workpiece article. Furthermore, because of the intricate configuration of some of the structures welded, which is particularly adapted to electron beam energy welding, in some instances it is extremely difficult if not impossible to remove such weld spatter.

Accordingly, what is needed in this art is a method of preventing such weld spatter from adhering to the workpiece surface when using electron beam energy for welding.

DISCLOSURE OF INVENTION

A method of preventing the adhesion of weld spatter to a workpiece surface when welding utilizing electron beam energy is disclosed. The workpiece surface or surfaces to be welded are coated with a uniform layer of polyimide containing sufficient surfactant to produce an adherent, acid resistant, uniform layer of polyimide on the surface. This method has particular utility for intricate structures or hard to reach areas where removal of spatter is impractical or impossible.

The foregoing and other features and advantages of the present invention will become more apparent from the following description and accompanying drawing.

BRIEF DESCRIPTION OF THE DRAWING

The figure shows schematically the process of the present invention.

BEST MODE FOR CARRYING OUT THE INVENTION

The method is particularly adapted to metal workpiece surfaces and especially conventional titanium and nickel based alloys used in gas turbine engine parts, for example rotating jet engine parts such as disks. Here weld spatter is a particularly serious problem since it can cause an unbalanced condition in the rotating parts, which are highly stressed. Furthermore, weld spatter can dislodge and cause serious engine damage.

Although this method is particularly described for electron beam energy welding, it can be used in any welding process where weld spatter is produced, e.g. laser beam welding. Any conventional electron beam (or laser beam) welding apparatus may be used to effect the weld.

While any polyimide resin with the requisite heat stability and acid resistance may be used with the present invention, Skybond ® 703 (Monsanto Co.) polyimide resin has been found to be particularly suitable.

While any surfactant which results in a uniform coating without pinholes or "fish eyes" may be used, a silicone surfactant, and especially Dow Corning ® 196 surfactant is especially preferred. This is a silicone-glycol copolymer having a low viscosity. The surfactant should be chosen based on the material of the metal workpiece. For example, while fluorocarbon surfactants such as 3M FC 430 are also workable, when using a nickel based alloy, fluorocarbon containing surfactants have the potential to react with the workpiece and therefore would be unacceptable. However, silicone surfactants do not suffer from this problem. The surfactant should be used in amounts less than about 0.5% by volume (20 milliliters/gallon of coating composition including solvent) and is typically used in amounts of about 0.079% to 0.26% (3 ml/gal to 10 ml/gal) and preferably 0.11% to 0.16% (4 ml/gal to 6 ml/gal). Whatever surfactant is used should be added in sufficient amount to provide uniform coverage of the polymer while not adversely affecting the adherence of the polymer to the workpiece. And, while additional agents such as coloring agents may be added to the polymer, these agents should not adversely affect or interact with the workpiece material.

It is essential that the film material be applied in uniform manner. This is particularly so since typically the workpiece material is cleaned such as by conventional acid pickling (e.g. $HNO_3.HF$) prior to welding. If the polymer coating is not present on the workpiece in a uniform layer or the adherence is poor, this pickling will tend to remove or get under the polyimide surface both destroying the coating and potentially damaging the workpiece. To obtain this uniform coating, in addition to using the surfactant in the manner as specified above, the polymer is applied from organic solvent solution. While any solvent which will dissolve the polymer and provide good flowout of the polymer and surfactant on the substrate may be used, an organic solvent solution of toluene and pyrrolidone is particularly preferred. This is a 50% mixture of each although excursions from this may be used. And while the concentration of polyimide and surfactant in this solvent may vary, typically about 25% to 75% by volume polyimide plus surfactant is used in the solvent with 50% by volume polyimide plus surfactant being preferred. Furthermore, while any application method such as brushing, wiping etc. may be used to apply the layer to the workpiece, spray application has been found to result in a particularly uniform coating. And while any thickness of coating which will remain through the pickling process can be used, typically coatings from 0.2 mil to 0.8 mil are applied in a mulitiple pass application. After application, the coating is typically heated to drive off the solvent and cure the resin. A typical curing cycle would be approximately a half hour at approximately 200° F., approximately a half hour at approximately 400° F., and approximately 5 minutes at approximately 600° F.

The coating applied should be so constituted so that it can be removed by chemical washing. Typically a heated solution of caustic soda with or without a conventional wetting agent may be used. For example, a 28% to 30% by weight sodium hydroxide solution heated to approximately 150° F. with a phosphate ester (Wyandotte Klearfac AA040) wetting agent has been found to be particularly suitable.

EXAMPLE

A simulated electron beam welding process for welding titanium alloy based drum rotors was evaluated to determine the effectiveness of the polyimide spatter protection coatings of the present invention. Visual, binocular, and photomacrographic examinations were conducted to observe spatter adherence. The coating composition was constituted as follows:

| Material | Make-Up | Suggested Limits |
|---|---|---|
| Toluene (or Xylene) | 50% (Volume) | 40-60% (Volume) |
| N—Methyl-2-Pyrrolidone | 50% (Volume) | 40-60% (Volume) |
| Surfactant combined with | 5 mls/gal | 4-6 mls/gal |
| Polyimide | 50% (Volume) | 40-60% (Volume) |

Three separate panels were coated. All panels were coated so as to result in strips of coated and uncoated areas. The first panel was coated to a two spray coating thickness of 0.2 to 0.3 mil; the second panel with a four spray coating thickness of 0.3 to 0.5 mil; and the third panel coated with a six spray coating thickness of 0.5 to 0.6 mil. The coatings were cured at 200° C. for one half hour, 400° F. for one half hour, and 600° F. for five minutes. The panels were alkali cleaned and pickled in nitric-hydrofluoric acid solutions. The panels were welded in a vacuum at $10^{-4}$ torr at 150 kilovolts, 60 milliamps, and at a beam speed of 120 inches per minute. Welding was performed to produce weld spatter on the coated panels. The coating was stripped off using a caustic soda solution. Examination revealed a spatter adherence adjacent to the weld on the uncoated portions of the panels and no spatter adherence on the coated portions of the panel after removal of the protective coating. Approximately 100 spatters per square inch were observed on the uncoated areas. The process is shown schematically in the figure where a metal substrate (1) having a polyimide coating thereon (2) is subject to electron beam energy (4) emanating from an electron beam source (3).

The curing should be controlled so as to cure the coating to the point of allowing it to be high temperature stable (e.g. able to withstand the heat of the spatter) but should not be cured to the point of beginning to carbonize the resin. And, as stated above, the coating should be easily strippable by chemical immersion and leave no residue.

Although this invention has been shown and described with respect to detailed embodiments thereof, it will be understood by those skilled in the art that various changes in form and detail thereof may be made without departing from the spirit and scope of the claimed invention.

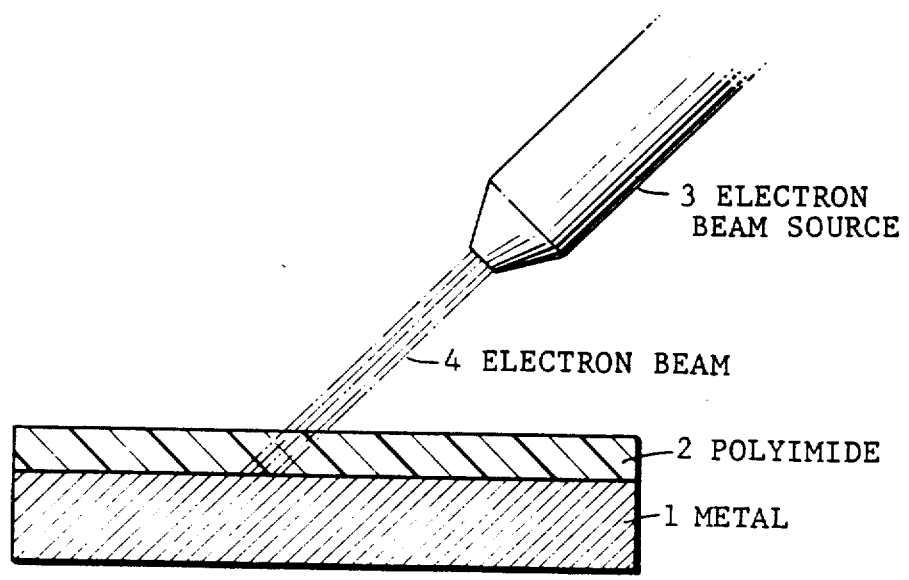

We claim:

1. A method of welding by localized impingement of electron beam energy on a workpiece surface, wherein the improvement comprises coating the workpiece surface with an adherent, acid resistant, heat stable, chemically removeable layer of polyimide containing less than about 0.5% by volume surfactant on the nonweld areas prior to welding, and removing the polyimide layer after welding.

2. The method of claim 1 wherein the surfactant is silicone and the polyimide is applied at a thickness of about 0.2 to about 0.8 mil.

* * * * *

UNITED STATES PATENT AND TRADEMARK OFFICE
CERTIFICATE OF CORRECTION

PATENT NO. : 4,532,403

DATED : July 30, 1985

INVENTOR(S) : Lester W. Jordan; Joseph F. Loersch; and Robert G. Adinolfi

It is certified that error appears in the above-identified patent and that said Letters Patent is hereby corrected as shown below:

The drawing should be inserted as part of the Letter Patent.

On the title page "2 Claims, No Drawings" should read --2 Claims, 1 Drawing.--

Signed and Sealed this

Fifteenth Day of October 1985

[SEAL]

Attest:

*Attesting Officer*

DONALD J. QUIGG

*Commissioner of Patents and Trademarks—Designate*